United States Patent [19]
Costa et al.

[11] Patent Number: 6,151,617
[45] Date of Patent: Nov. 21, 2000

[54] MULTIPLIER CIRCUIT FOR MULTIPLICATION OPERATION BETWEEN BINARY AND TWOS COMPLEMENT NUMBERS

[75] Inventors: Raffaele Costa, Milan; Anna Faldarini, Sondrio; Laura Formenti, Cabiate, all of Italy

[73] Assignee: STMicroelectronics S.r.l., Agrate Brianza, Italy

[21] Appl. No.: 09/333,693

[22] Filed: Jun. 16, 1999

Related U.S. Application Data

[63] Continuation of application No. 08/577,305, Dec. 22, 1995, Pat. No. 5,935,201.

[30] Foreign Application Priority Data

Dec. 22, 1994 [EP]  European Pat. Off. .............. 94830581

[51] Int. Cl.[7] ....................................................... G06F 7/52
[52] U.S. Cl. ........................................... 708/625; 708/626
[58] Field of Search ................................... 708/625–628, 708/700, 703

[56] References Cited

U.S. PATENT DOCUMENTS

| | | | |
|---|---|---|---|
| 4,153,938 | 5/1979 | Ghest et al. ............................. | 364/760 |
| 5,121,352 | 6/1992 | Hesson .................................... | 364/757 |

FOREIGN PATENT DOCUMENTS

WO 91/19249  12/1991  WIPO ............................... G06F 7/52

OTHER PUBLICATIONS

Roth, Jr. "Fundamentals of Logic Design" Second Edition, Chapter 8.4–8.6, pp. 164–170.

Paolo Montuschi and Luigi Ciminera, "n×n Carry–Save Multipliers without Final Addition," in *Proc. 11th Symposium on Computer Arithmetic*, IEEE Computer Society IEEE Technical Committee on VLSI, Windsor, Ontario, Canada, Jun. 29–Jul. 2, 1993, pp. 54–61.

*Primary Examiner*—Tan V. Mai
*Attorney, Agent, or Firm*—Theodore E. Galanthay; E. Russell Tarleton; Seed IP Law Group PLLC

[57] ABSTRACT

A multiplier circuit multiplies together both natural and two's complement binary numbers, which it receives in the form of electric signals having predetermined logic values, that are applied to input terminals of logic gating circuits. The logic gating circuits provide partial products of the bits of the two binary factors, and a combinatorial network provides the final sum of the partial products. The partial multiplications that include at least one of the more significant bits of the operands are performed by logic gating circuits which can be enabled to also carry out a two's complement partial multiplication. The multiplier circuit further includes additional logic gating circuits which supply the combinatorial network with additive constants with predetermined logic values unrelated to the factors.

12 Claims, 5 Drawing Sheets

MULTIPLIER CIRCUIT FOR MULTIPLICATION OPERATION BETWEEN BINARY AND TWOS COMPLEMENT NUMBERS

CROSS-REFERENCE TO RELATED APPLICATION

This application is a continuation of U.S. patent application Ser. No. 08/577,305, filed Dec. 22, 1995 U.S. Pat. No. 5,935,201.

TECHNICAL FIELD

This invention relates to multiplier circuits for accomplishing operations with binary numbers, and in particular, to a monolithically integratable multiplier circuit which can be used in integrated circuit microprocessors or microcontrollers.

BACKGROUND OF THE INVENTION

Among the circuits for carrying out arithmetical operations of multiplication, multipliers having a typical, iterative structure or architecture known as a "cellular array" have been found to be especially advantageous.

Assuming that two integers expressed in natural binary form with 4 parallel-supplied bits are to be multiplied together, $$A = a_3*2^3 + a_2*2^2 + a_1*2 + a_0$$

$$B = b_3*2^3 + b_2*2^2 + b_1*2 + b_0$$

then the product is, $$A*B = b_0(a_3*2^3 + a_2*2^2 + a_1*2 + a_0) +$$

$$2b_1(a_3*2^3 + a_2*2^2 + a_1*2 + a_0) +$$

$$4b_2(a_3*2^3 + a_2*2^2 + a_1*2 + a_0) +$$

$$8b_3(a_3*2^3 + a_2*2^2 + a_1*2 + a_0)$$

Therefore, the product of A by B is obtained by adding together the partial products wherein the terms making up the following matrix appear:

$$\begin{array}{cccc} a_3b_0 & a_2b_0 & a_1b_0 & a_0b_0 \\ a_3b_1 & a_2b_1 & a_1b_1 & a_0b_1 \\ a_3b_2 & a_2b_2 & a_1b_2 & a_0b_2 \\ a_3b_3 & a_2b_3 & a_1b_3 & a_0b_3 \end{array}$$

There are several different types of algorithms whereby the sum of the partial products thus computed can be reckoned. Iterative array multipliers consist of a combinatorial network which performs this addition with a delay which is only dependent on the time required to go through the various logic circuits.

The computation of the matrix of partial products is accomplished using a combinatorial network of logic AND gating circuits whereby all the matrix bits are obtained simultaneously with just the delay of a simple logic product. If the size of the operands is of n bits, then n*n AND gates will be required.

There are several circuit architectures that can provide the sum of the individual logic products making up the partial product matrix. Of considerable import is Dadda's algorithm, described in an article entitled "Some Schemes for Parallel Multipliers", Alta Frequenza, Vol. XXXIV, No. 5, May 1965, which yields the sum of the individual partial products by compressing the matrix columns, that is progressively reducing the number of the rows which make up the partial product matrix by adding together the bits in one column until two rows only are obtained whose sum, representing the result of the multiplication, is obtained using a fast adder. Thus, the multiplier is composed of three parts: the matrix structure of AND gates which is to compute the partial products, the circuit for compressing the columns, and the final adder.

For effecting the column compression portion of the procedure, parallel counters may be used, that is components which will count the number of bits equal to 1 present at their inputs; where two inputs only are provided, these would be so-called Half-Adders ("HA"), whereas with three inputs provided, these would be so-called Full Adders ("FA"). However, they may also be defined for any number of inputs greater than three.

Dadda uses both FAs and HAs in his multiplier, and shows that the best method (i.e., that requiring the smallest number of cells) consists of compressing the columns such that the number of rows which make up the partial product matrix decreases in accordance with the following recursive formula:

$$d(0) = 2$$

$$d(+1) = 3/2 d(k)$$

where, d(i) is the number of rows in the i-th stage, and k is the number of stages required for the reduction.

Thus, the following series is generated:

| | | | | k | | | | | |
|---|---|---|---|---|---|---|---|---|---|
| 0 | 1 | 2 | 3 | 4 | 5 | 6 | 7 | 8 | 9 |
| d(k) | | | | | | | | | |
| 2 | 3 | 4 | 6 | 9 | 13 | 19 | 28 | 42 | 63 |

For example, in the 8×8 case, the initial number (8) of the rows must be reduced to 6, 4, 3, and ultimately 2; accordingly, 4 stages are required.

The algorithm provides for the use of FAs and HAs arranged in a structure which ensures that no more than d(k) rows exist in the k-th stage.

Also described in the article is Wallace's block diagram, and reflections are offered on the parallel adders used in binary number multipliers.

In another, more recently published article by L. Dadda, entitled "On Parallel Digital Multiplier", Alta Frequenza, Vol. XLV, No. 10, October 1976, the parallel implementation of the adders is dealt with, using "fast" storage elements to provide high-speed digital multipliers.

The technique employed for multiplying natural binary numbers may also be used for relative numbers, expressed in binary form, by representing the negative value numbers in the two's complement binary form. The necessary add operation is carried out by two's complementing the negative terms. This allows the complexity of the arithmetic circuits of a processor to be greatly reduced and, accordingly, the speed of operation increased.

Known are natural number multipliers, two's complement binary number multipliers, and multipliers which either enable two natural binary numbers or two's complement binary numbers to be multiplied together.

However, there is an unmet need in the art for a multiplier circuit for accomplishing multiplication operations with two binary operands, each operand either in the natural or two's complement form, as desired.

SUMMARY OF THE INVENTION

The present invention provides a multiplier circuit that performs multiplication operations with two binary operands, either of which may be in natural or twos complement form. This is achieved without prejudice for the high-speed and design simplicity features of conventional multiplier circuits, in particular Dadda's circuits.

A multiplier circuit multiplies together both natural and two's complement binary numbers, which it receives in the form of electric signals having predetermined logic values, that are applied to input terminals of logic gating circuits. The logic gating circuits provide partial products of the bits of the two binary factors, and a combinatorial network provides the final sum of such partial products. The partial multiplications that include at least one of the more significant bits of the operands are performed by logic gating circuits which can be enabled to also carry out a two's complement partial multiplication. The multiplier circuit firer includes additional logic gating circuits which supply the combinatorial network with additive constants with predetermined logic values unrelated to the factors.

BRIEF DESCRIPTION OF THE DRAWINGS

The features and advantages of a multiplier circuit according to the invention will be apparent from the following description of an embodiment thereof, given by way of non-limitative example with reference to the accompanying drawings.

DETAILED DESCRIPTION OF THE INVENTION

Figure 1:
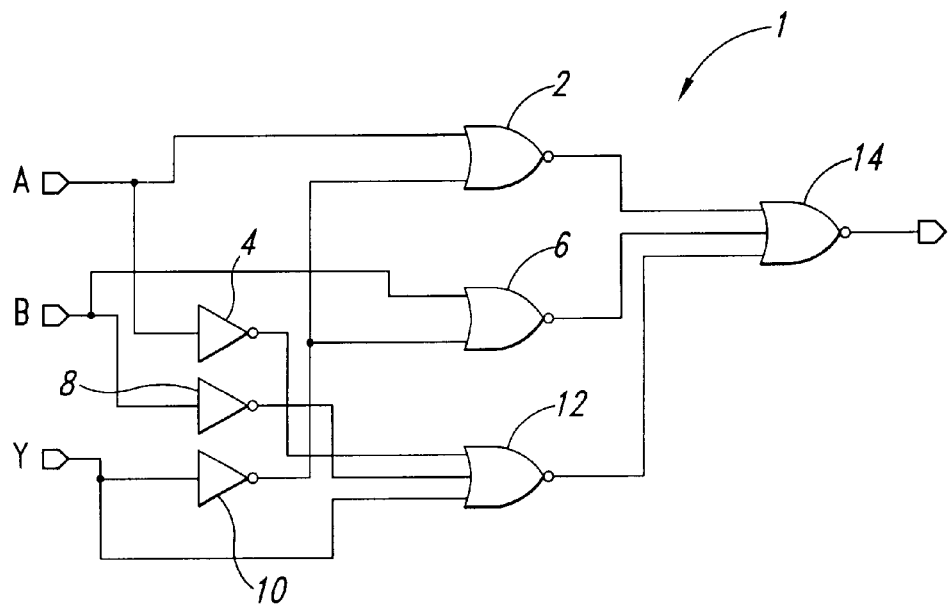
FIGS. 1, 2 and 3 show possible circuit arrangements implementing the logic gating circuits which are to provide the partial products of the binary factors with two's complement function.

Many of the known multiplier circuits use factor re-coding techniques, such as Booth's algorithm, to provide high-performance capabilities.

Such re-coding techniques allow the multiplication operation to be greatly simplified in that they allow the number of the partial products entering the computation to be reduced preliminarily, thereby reducing the time required for the multiplication, or the physical size of the multiplier circuit.

In accordance with the invention, the multiplier circuit has instead an iterative structure of a standard type, which is matched to the four product types involved by appropriate logic circuits effective to serve functions of partial product complementing and of adding additive constants which are independent of the operands, using the so-called method of the additive constants for computing the product.

As previously stated, both factors may be natural numbers, two's complement numbers, or one may be a two's complement and the other a natural number.

It can at all events be shown that all the cases of the possible products for current devices, such as 8×16 bits or 16×16 bits, can be encompassed by one or more multiplications of 8×8 bits belonging to one of the following four types. The factors A and B are designated as follows:

$$A = a_7 a_6 a_5 a a_3 a_2 a_1 a_0 \text{ and } B = b_7 b_6 b_5 b b_3 b_2 b_1 b_0$$

a) 8×8 multiplication—where $a_7$ and $b_7$ have positive weight, and therefore, the partial products $a_0 b_0 \ldots a_7 b_7$ (designated X in the following charts) are added in the natural mode; the matrix of partial products has the following structure:

```
XXXXXXXX
XXXXXXXX
XXXXXXXX
XXXXXXXX
XXXXXXXX
XXXXXXXX
XXXXXXXX
XXXXXXXX
```

Thus, the product of natural A and natural B will be a natural number.

b) 8×8 multiplication—where $b_7$ has negative weight. In this case, those partial products which contain bit $b_7$ should be complemented, and a suitable constant should be added to the result of the multiplication (elements to be complemented are underlined):

```
XXXXXXXX
XXXXXXXX
XXXXXXXX
XXXXXXXX
XXXXXXXX
XXXXXXXX
XXXXXXXX
XXXXXXXX
100000001
```

Thus, the product of natural A and relative B will be a relative number.

c) 8×8 multiplication—where $a_7$ has negative and $b_7$ positive weight. Here, it is the partial products which contain $a_7$ that should be complemented. In view of the structure being symmetrical with the case b) above, the additive constant will be the same.

```
X XXXXXXX
X XXXXXXX
X XXXXXXX
X XXXXXXX
X XXXXXXX
X XXXXXXX
X XXXXXXX
X XXXXXXX
1 0 0 0 0 0 0 0 1
```

The product of relative A and natural B will, therefore, be a relative number.

d) 8×8 multiplication—where both $a_7$ and $b_7$ have negative weight. The partial products which contain $a_7$ and $b_7$ should be complemented except $a_7 b_7$.

The additive constant will be the sum of the constants in the previous two cases b) and c).

```
X XXXXXXX
X XXXXXXX
X XXXXXXX
X XXXXXXX
X XXXXXXX
X XXXXXXX
X XXXXXXX
X XXXXXXX
1 0 0 0 0 0 0 0 1
```

Thus, the product of relative A and relative B will be a relative number.

The example of the partial product matrix resulting in the instance of 8×8 bits, to which can be reduced as mentioned even the more complex cases of 8×16 bits and 16×16 bits, is in no way limiting.

The same method can be used for cases of m×n bits, where m and n are any selected integers.

Those elements which belong to the main diagonal of the partial product matrix should, therefore, be complemented if a multiplication of the c) or d) type is to be performed, while those in the bottom row should be complemented in the instance of a b) or d) operation. The matrix of partial products should, moreover, be added bits representing the additive constant. In the b) and c) cases, the additive constant is given by the following sequence of bits:

1000000100000000 and in the d) case by:

1000001000000000.

In the a) situation, the constant would be zero.

These considerations can be accounted for by introducing three bits, P, Q and S, into the partial product matrix in accordance with a scheme as shown here below:

$$
\begin{array}{cccccccccccccccc}
 & & & & & & & & E_8 & a_6b_0 & a_5b_0 & a_4b_0 & a_3b_0 & a_2b_0 & a_1b_0 & a_0b_0 \\
 & & & & & & & E_9 & a_6b_1 & a_5b_1 & a_4b_1 & a_3b_1 & a_2b_1 & a_1b_1 & a_0b_1 \\
 & & & & & & E_{10} & a_6b_2 & a_5b_2 & a_4b_2 & a_3b_2 & a_2b_2 & a_1b_2 & a_0b_2 \\
 & & & & & E_{11} & a_6b_3 & a_5b_3 & a_4b_3 & a_3b_3 & a_2b_3 & a_1b_3 & a_0B_3 \\
 & & & & E_{12} & a_6b_4 & a_5b_4 & a_4b_4 & a_3b_4 & a_2b_4 & a_1b_4 & a_0b_4 \\
 & & & E_{13} & a_6b_5 & a_5b_5 & a_4b_5 & a_3b_5 & a_2b_5 & a_1b_5 & a_0b_5 \\
 & & E_{14} & a_6b_6 & a_5b_6 & a_4b_6 & a_3b_6 & a_2b_6 & a_1b_6 & a_0b_6 \\
 & E_7 & E_6 & E_5 & E_4 & E_3 & E_2 & E_1 & E_0 \\
P & & & & & & Q & S
\end{array}
$$

which represents the partial product matrix in its most general form, again for the preferred example with 8-bit numbers.

Shown in more detail in the two charts that follow is the value taken by the functions $E_0, E_1, E_2, \ldots, E_{14}, P, Q$ and S in each of the four cases, identified here by two bits X and Y.

|   | X | Y | $E_0$ | $E_1$ | $E_2$ | $E_3$ | $E_4$ | $E_5$ | $E_6$ | $E_7$ |
|---|---|---|---|---|---|---|---|---|---|---|
| a | 0 | 0 | $a_0b_7$ | $a_1b_7$ | $a_2b_7$ | $a_3b_7$ | $a_4b_7$ | $a_5b_7$ | $a_6b_7$ | $a_7b_7$ |
| b | 0 | 1 | $\overline{a_0b_7}$ | $\overline{a_1b_7}$ | $\overline{a_2b_7}$ | $\overline{a_3b_7}$ | $\overline{a_4b_7}$ | $\overline{a_5b_7}$ | $\overline{a_6b_7}$ | $\overline{a_7b_7}$ |
| c | 1 | 0 | $a_0b_7$ | $a_1b_7$ | $a_2b_7$ | $a_3b_7$ | $a_4b_7$ | $a_5b_7$ | $a_6b_7$ | $a_7b_7$ |
| d | 1 | 1 | $\overline{a_0b_7}$ | $\overline{a_1b_7}$ | $\overline{a_2b_7}$ | $\overline{a_3b_7}$ | $\overline{a_4b_7}$ | $\overline{a_5b_7}$ | $\overline{a_6b_7}$ | $a_7b_7$ |

|   | X | Y | $E_8$ | $E_9$ | $E_{10}$ | $E_{11}$ | $E_{12}$ | $E_{13}$ | $E_{14}$ |
|---|---|---|---|---|---|---|---|---|---|
| a | 0 | 0 | $a_7b_0$ | $a_7b_1$ | $a_7b_2$ | $a_7b_3$ | $a_7b_4$ | $a_7b_5$ | $a_7b_6$ |
| b | 0 | 1 | $a_7b_0$ | $a_7b_1$ | $a_7b_2$ | $a_7b_3$ | $a_7b_4$ | $a_7b_5$ | $a_7b_6$ |
| c | 1 | 0 | $\overline{a_7b_0}$ | $\overline{a_7b_1}$ | $\overline{a_7b_2}$ | $\overline{a_7b_3}$ | $\overline{a_7b_4}$ | $\overline{a_7b_5}$ | $\overline{a_7b_6}$ |
| d | 1 | 1 | $\overline{a_7b_0}$ | $\overline{a_7b_1}$ | $\overline{a_7b_2}$ | $\overline{a_7b_3}$ | $\overline{a_7b_4}$ | $\overline{a_7b_5}$ | $\overline{a_7b_6}$ |

These charts represent the truth table for the two's complement functions added to the partial product matrix, while the additive constant can be calculated as follows:

$$P = X + Y \quad Q = X \times Y \quad S = X \oplus Y$$

where the logic operations specified are of the OR, AND and EXOR types, respectively.

In a similar way to conventional multiplier circuits, the multiplier circuit of this invention includes a structure with logic gating circuits for receiving, in the form of electric signals having predetermined logic values, the two binary numbers which are to be multiplied together and for obtaining the partial products shown in the general matrix layout.

In the most general of cases, this structure includes m groups of n logic gating circuits, where m and n are the bits of the two binary numbers to be multiplied, which would usually have the same number of bits (m=n).

Such logic gating circuits have first and second input terminals for the electric signals and an output terminal which is connected to a combinatorial network for the final summing of the partial products.

Applied to the first input terminal of all the logic gating circuits in one group is one of the m electric signals which encode one of the two binary numbers.

The second input terminal of each logic gating circuit in one group instead receives one of the n electric signals which encode the other binary number, which signal would be a different one for each logic gating circuit in one group.

According to this invention, those logic gating circuits which receive electric signals corresponding to the most significant bits of the two binary numbers (at both, or at least one of, the first and second input terminals) and carry out the operations with two's complement function, as indicated in the matrix layout by the character E, also have at least a third input terminal and may even have a fourth input terminal.

These terminals receive, for all the logic gating circuits mentioned above, similar electric control signals having predetermined values, whereby each of the logic gating circuits can be enabled to also carry out a two's complement operation on the product of the signals applied to the first and second input terminals.

The logic gating circuits with two input terminals may be provided as standard logic AND circuits. However, the logic gating circuits with four input terminals may be implemented with differently if desired.

FIG. 1 shows an implementation of those logic gating circuits which provide the partial products with two's complement function, $E_0$, $E_1$, $E_2$, $E_3$, $E_4$, $E_5$ and $E_6$. The logic gating circuit 1 of FIG. 1 has first, second, and third input terminals. First, input terminal receives a bit of the first number A to be multiplied. The logic gating circuit 1 providing partial product $E_0$ receives bit $a_0$ at the first input terminal; the logic gating circuit 1 providing partial product $E_1$ receives bit $a_1$ at the first terminal A, and so on for the bits of the first number to be multiplied. For example, in an 8-bit number, the logic circuit 1 providing partial product $E_7$ receives bit $a_7$ at the first input terminal. On the other hand, the logic circuit 1 of FIG. 1 is coupled to receive bit $b_7$ at the second input terminal regardless of the partial product provided. The logic circuit 1 of FIG. 1 has a third input terminal coupled to receive bit Y.

The first input terminal is coupled to a first input terminal of NOR gate 2. The first input terminal is also coupled to an input terminal of a first inverter 4. The second input terminal is coupled to a first input terminal of a second NOR gate 6 and is also coupled to an input terminal of a second inverter 8. The third input terminal is coupled to an input terminal of a third inverter 10 and is also coupled to a first input terminal of a third NOR gate 12.

The output terminal of third inverter 10 is coupled to a second input terminal of first NOR gate 2 and to a second input terminal of second NOR gate 6. The output terminal of second inverter 8 is coupled to a second input terminal of third NOR gate 12, and the output terminal of first inverter 4 is coupled to a third input terminal of third NOR gate 12. The output terminals of first NOR gate 2, second NOR gate 6, and third NOR gate 12 are coupled to first, second and third input terminals of fourth NOR gate 14, respectively. The output terminal of fourth NOR gate 14 provides the partial product. When bit Y is high, i.e., a logic 1, the logic circuit 1 of FIG. 1 is enabled to perform a two's complement logic multiplication operation.

Figure 2:
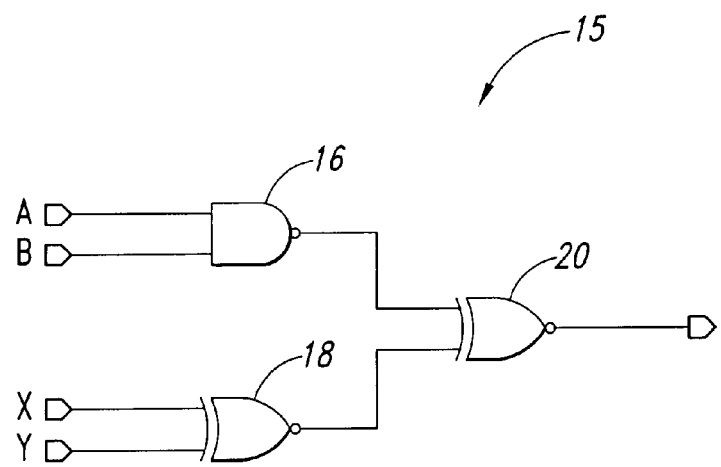

FIG. 2 shows an implementation of the logic gating circuit which provides $E_7$. The logic circuit 15 of FIG. 2 has a first input terminal coupled to receive bit $a_7$, a second input terminal coupled to receive bit $b_7$, a third input terminal coupled to receive bit X, and a fourth input terminal coupled to receive bit Y. The first input terminal is coupled to a first input terminal of NAND gate 16, and the second input terminal is coupled to a second input terminal of NAND gate 16. The third input terminal is coupled to a first input terminal of exclusive NOR gate 18, and the fourth input terminal is coupled to a second input terminal of exclusive NOR gate 18. The output terminal of NAND gate 16 is coupled to a first input terminal of exclusive NOR gate 20, and the output terminal of exclusive NOR gate 18 is coupled to a second input terminal of exclusive NOR gate 20. The output terminal of exclusive NOR gate 20 provides the partial product of bits $a_7$ and $b_7$. When bits X and Y have different logic values, i.e., bit X is low and bit Y is high, or bit X is high and bit Y is low, the logic circuit 15 of FIG. 2 is enabled to perform a two's complement logic multiplication operation.

Figure 3:
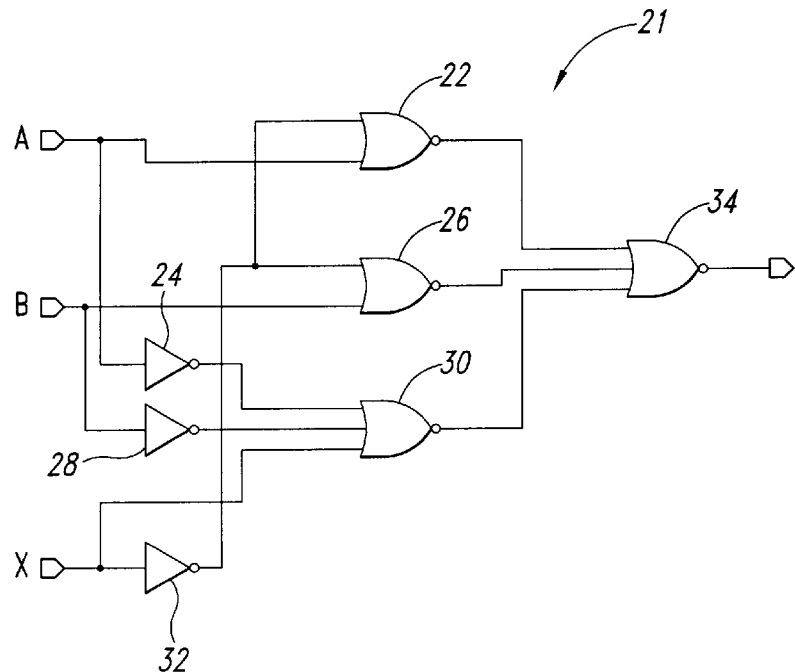

FIG. 3 shows an implementation of those logic gating circuits which provide $E_8$, $E_9$, $E_{10}$, $E_{11}$, $E_{12}$, $E_{13}$ and $E_{14}$. The logic circuit 21 of FIG. 3 has a first input terminal coupled to receive bit $a_7$. A second input terminal is coupled to receive bits, to be multiplied with bit $a_7$, as follows. The logic circuit 21 providing partial product $E_8$ is coupled to receive bit $b_0$ at the second input terminal. The circuit 21 providing partial product $E_9$ receives bit $b_1$ at the second input terminal. This pattern continues up to the circuit 21 for providing partial product $E_{14}$, which receives bit $b_6$ at input terminal B. A third input terminal is coupled to receive bit X.

The first input terminal is coupled to a first input terminal of first NOR gate 22, and to an input terminal of first inverter 24. The second input terminal is coupled to a first input terminal of second NOR gate 26 and is coupled to an input terminal of second inverter 28. Input terminal X is coupled to a first input terminal of third NOR gate 30, and is coupled to an input terminal of third inverter 32.

The output terminal of third inverter 32 is coupled to a second input terminal of first NOR gate 22, and to a second input terminal of second NOR gate 26. The output terminal of second inverter 28 is coupled to a second input terminal of third NOR gate 30, and the output terminal of first inverter 24 is coupled to a third input terminal of third NOR gate 30. The output terminals of first NOR gate 22, second NOR gate 26, and third NOR gate 30 are coupled to first, second, and third input terminal of fourth NOR gate 34, respectively. The output terminal of NOR gate 34 provides partial products $E_8$, $E_9$, $E_{10}$, $E_{11}$, $E_{12}$, $E_{13}$, and $E_{14}$. The logic circuit of FIG. 3 is enabled to perform a two's complement logic multiplication operation when bit X is high, i.e., a logic 1.

A multiplier circuit according to the invention further includes first, second and third additional logic gating circuits, each having first and second input terminals and an output terminal.

Such additional circuits supply the combinatorial network with signals having a predetermined logic value, unrelated to the binary factors, for addition to the output signals from the other logic gating circuits.

The input terminals of the additional circuits receive the same signals as are applied to the third and fourth terminals of the logic gating circuits for the partial products with two's complement function.

The predetermined logic values of the control signals correspond to the bits X and Y in the above charts, and therefore, are associated with cases a), b), c) and d) of multiplication type.

Figure 4:
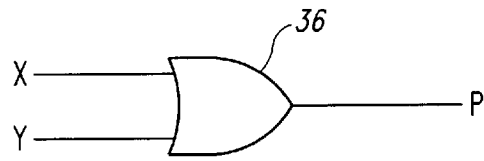
FIG. 4 shows a first additional logic gating current according to the invention.
Figure 5:
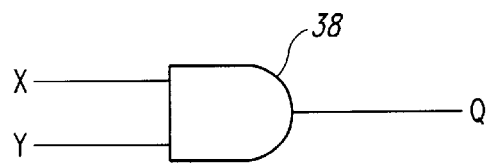
FIG. 5 shows a second additional logic gating current according to the invention.
Figure 6:
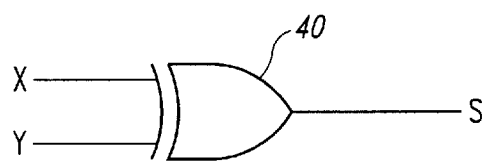
FIG. 6 shows a third additional logic gating circuit according to the invention.

The additional logic gating circuits are, as mentioned above, ordinary logic circuits of the OR, AND, and EXOR types. FIG. 4 shows the first additional logic gating circuit as OR gate 36. OR gate 36 is coupled to receive bit X at a first input terminal and bit Y at a second input terminal, and provides additive constant P at an output terminal of OR gate 36. FIG. 5 shows the second additional logic gating circuit as AND gate 38. AND gate 38 is coupled to receive bit X at a first input terminal and bit Y at a second input terminal, and provides additive constant Q at an output terminal. FIG. 6 shows third additional logic gating circuit as exclusive OR gate 40. Exclusive OR gate 40 is coupled to receive bit X at a first input terminal and bit Y at a second input terminal, and provides additive constant S at an output terminal.

The electric signals corresponding to the bits X and Y are generated by circuit means in the system which includes the multiplier circuit based upon a determination of either the natural or two's complement form of the binary operands.

Figure 7:
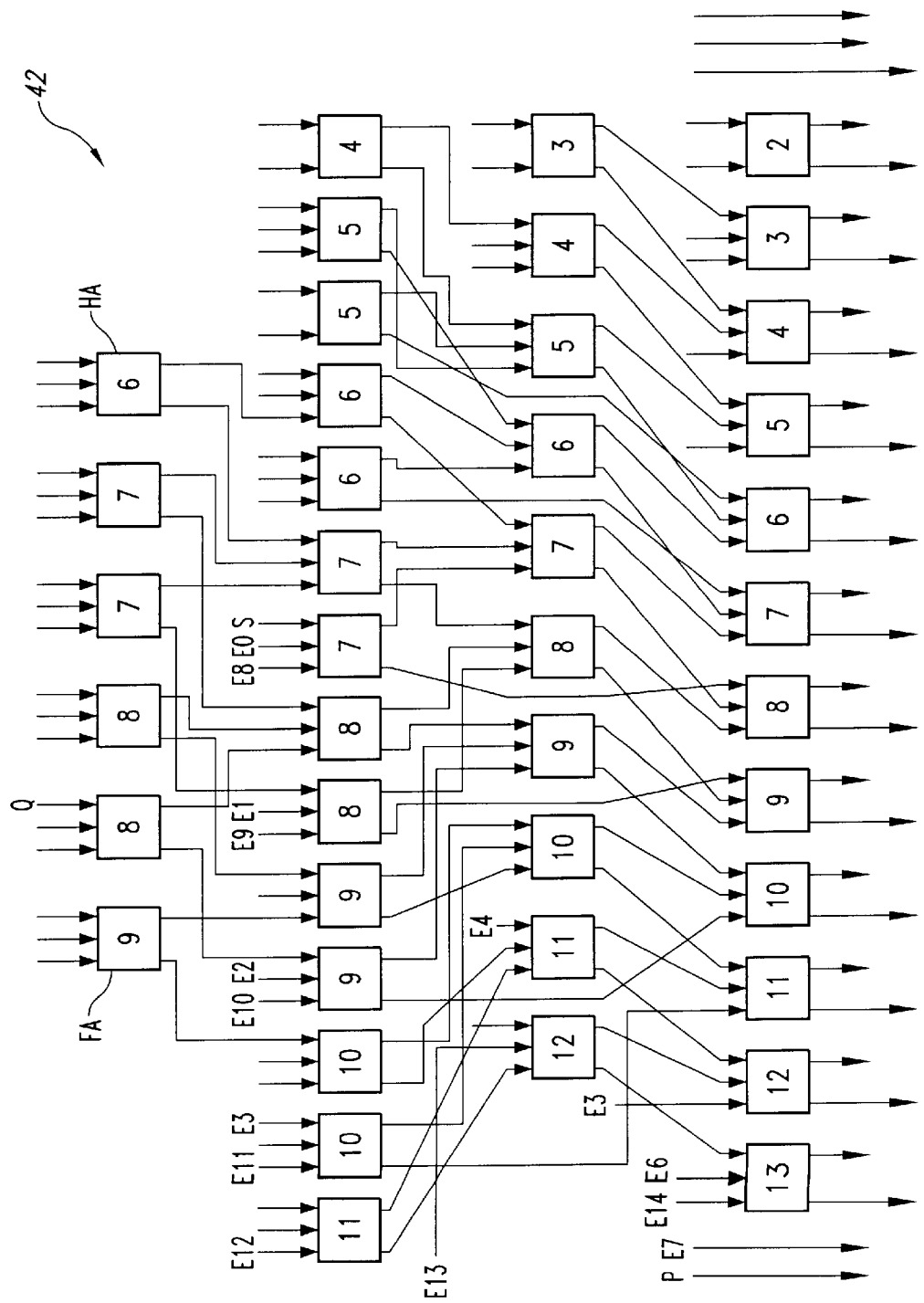
FIG. 7 shows a first example of a combinatorial network for combining partial products according to the present invention.

FIG. 7 shows a combinatorial network 42 for combining the partial products supplied the logic gating circuits of FIGS. 1, 2, and 3, and the signals supplied by the additional logic gating circuits of FIGS. 4, 5, and 6. As can be seen, combinatorial network 42 includes 37 fill adders FA and 5 half adders. HA, and includes 4 cascade-connected stages of adders. The adders included in combinatorial network 42 are well known and will not be discussed in detail.

On applying the rules discussed above to the multiplier developed by Dadda, it will be appreciated that the changes made do not affect the delay in computation time. As regards the silicon area occupied, the increase is a modest one. In fact, both the number of the stages (four stages in cascade) and the total number of the adders (37 FAs plus 5 HAs instead of 35 FAs plus 7 HAs) may be left unchanged if the circuit is designed using a method similar to Dadda's.

It should be noted, however, that for the same partial product matrix and functions and additive constants as specified above, in designing a multiplier circuit according to this invention, the column compression portion can be implemented in any of several different ways.

Figure 8:
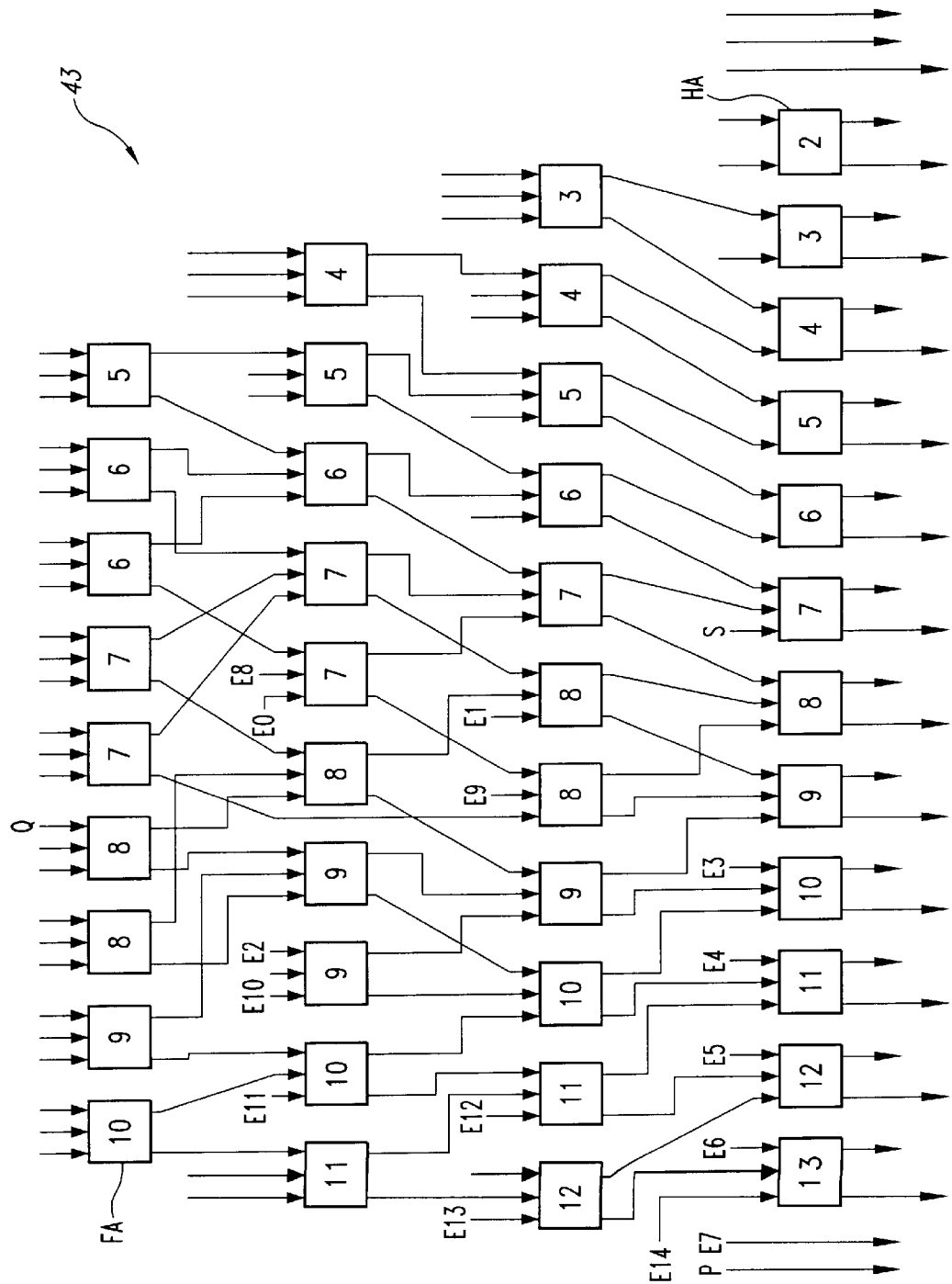
FIG. 8 shows a second example of a combinatorial network for combining partial products according to the present invention.

For example, the integration area efficiency can be improved by a distribution of FAs and HAs which is as equal as possible among the various stages and a reduction in the number of interconnects. An example of such a combinatorial network is shown in FIG. 8. Combinatorial network 43 includes four stages of full adders FA and half adders HA. As can be seen, the lowest number of adders per stage is 9; the highest is 12. This distribution of adders is more equal than that of combinatorial network 42 of FIG. 7, in which the number of adders per stage varies between a low of 6 and a high of 4.

Figure 9:
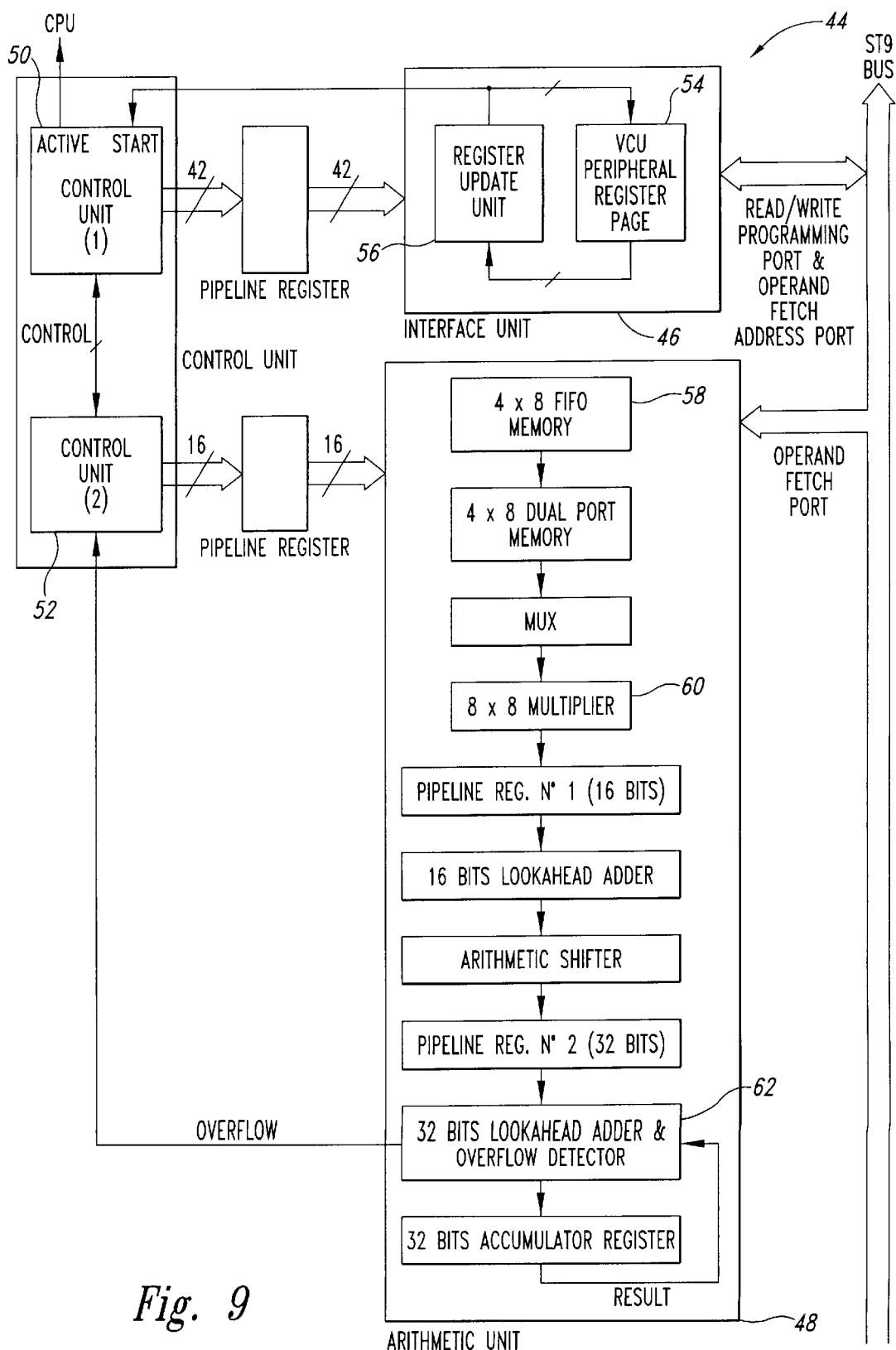
FIG. 9 shows a block diagram for a vectorial calculus unit incorporating a multiplier circuit according to the invention.

Shown in FIG. 9 is a block diagram for an application of a fast multiplier circuit according to the invention which can operate on either forms of binary numbers.

FIG. 9 shows a dedicated arithmetic macro-cell (VCU) 44 for calculating the scalar product (or internal product) of the two integer vectors, adapted to be integrated to a microcontroller using a technology of the VLSI type. The VCU 44 is a macrocell dedicated to the computation of the inner product of two vectors of integer numbers, and is based on the multiply and accumulate algorithm. The macrocell contains two units, interface unit 46 and arithmetic unit 48. Interface unit 46 is controlled by interface control unit 50, and arithmetic unit 48 is controlled by arithmetic control unit 52.

The interface unit 46 fetches the operands from the microcontroller's memories. It includes VCU peripheral register page 54—a page of registers with the addresses of the operands—and a register update unit 56 for updating the registers after each addressing. The arithmetic unit 48 realizes the inner product according to the relationship: S=A*B, i.e., $S=a_i*b_i$. Arithmetic unit 48 includes a FIFO memory 58 for storing the operands of each multiplication, an 8*8 multiplier 60 and a 32 bit adder 62 for the products accumulation.

The processing speed is usually a concern in integrated circuit microprocessor or microcontroller applications, and accordingly in one embodiment of the invention it is used in integrated circuits in which the mode of inputting the digital signals that represent the operands and outputting the signals that represent the result is of the parallel type rather than serial type.

In another embodiment it is used in a serial type application and can also be used in a mited mode application. Thus, the possibility of it being used in a serial or mixed mode should not be ruled out.

It will be appreciated that the embodiment described hereinabove in an illustrative and non-limitative sense may the subject of modifications, supplements and substitutions of elements without departing from the protection scope of the following claims.

What is claimed is:

1. A circuit for multiplying two multiple-bit numbers in binary unsigned mode, two's complement mode, and mixed mode, the circuit comprising:

a first stage of logic circuits configured to receive the two multiple-bit numbers and to receive at least two control signals, and to generate a first group of partial products, a second group of one partial product, and a third group of partial products, the first stage of logic circuits further comprising a first group of logic circuits configured to generate the first group of partial products, a second group of logic circuits configured to generate the second group of one partial product, and a third group of logic circuits configured to generate the third group of partial products;

the second group of logic circuits having a first input terminal coupled to receive a most significant bit of the first multiple-bit number, and a second input terminal coupled to receive a most significant bit of the second multiple-bit number, a third input terminal coupled to receive a first control signal, and a fourth input terminal coupled to receive a second control signal, the second group of logic circuits is enabled to complement the partial product of the most significant bit of the first multiple-bit number and the second multiple-bit number when the first control signal has one of a first and second logic states and the second control signal as an other of the first and second logic states; and a second stage of logic circuits configured to output a combination of the first, second, and third group of partial products representing a product of the first and second multiple-bit numbers.

2. The circuit of claim 1 wherein the second stage comprises a matrix of full and half adders.

3. The circuit of claim 1 wherein the first group of logic circuits comprise a group of NOR-NOR logic circuits.

4. A multiplier circuit for receiving a first binary number having plural bits and a second binary number having plural bits, each having a logic value representing integer numbers within any desired values, and multiplying the first and second binary numbers in unsigned mode, two's complement mode, and a mixed mode, the multiplier circuit comprising:

a first stage of logic circuits configured to receive the first and second binary numbers and two control signals, and comprising a first group of logic circuits configured to generate partial products of all but the two most significant bits of the first and second binary numbers, a second group of logic circuits configured to generate partial products of only the two most significant bits of the first and second binary numbers, and a third group of logic circuits configured to generate partial products of the first and second control signals, the second group of logic circuits in the first stage of logic circuits has a first input terminal coupled to receive a most significant bit of the first binary number, a second input terminal coupled to receive a most significant bit of the second binary number, a third input terminal coupled to receive the first control signal, and a fourth input terminal coupled to receive the second control signal, the second group of logic circuits is enabled to complement the partial product of the most significant of the first and second binary numbers when the first control signal has one of a first and second logic states and the second control signal has an other of the first and second logic states, and the third group of logic circuits comprises first, second, and third additional logic gating circuits, each having first and second input terminals for receiving the first and second control signals, and an output terminal for supplying the combinatorial network of logic circuits with partial product output signals for addition to the partial products from the first and second group of logic circuits;

a second stage configured to receive the partial products of the first, second, and third groups of logic circuits, the second stage comprising a combinatorial network of logic circuits for adding the first, second, and third groups of partial products to form a product of the first and second binary numbers.

5. The circuit of claim 4 wherein the first, second, and third additional logic gating circuits comprise OR, AND, and exclusive OR gate circuits, respectively.

6. The circuit of claim 4 wherein the first group of logic circuits includes an input terminal configured to receive one of the first and second control signals, and the second group of logic circuits is configured to receive both the first and second control signals.

7. A method for multiplying two multiple-bit binary numbers in unsigned mode, two's complement mode, and mixed mode, the method comprising:

performing a first stage of partial product generation, comprising:

generating a first group of partial products from all but the two most significant bits of the first and second binary numbers by complementing only partial product bits for a most significant bit of the first multiple-bit binary number or a most significant bit of the second multiple-bit binary number when a first input to the first group of logic circuits or a second input to the first group of logic circuits represents a two's complement value, respectively, and generating each partial product in the first group of partial products comprises receiving input from only one of the first and second control signals and one bit from each of the first and second numbers;

generating a second group of one partial product from only the two most significant bits of the two multiple-bit binary numbers by receiving input from only the most significant bit of each number and from the first and the second control signals; and generating a third group of three partial products from two control signals by receiving input from only the first and the second control signals;

performing a second stage of partial product combination, comprising:

combining the partial products from the first, second, and third groups of partial products to form a product of the first and second multiple-bit binary numbers.

8. The method of claim 7 wherein generating a first group of partial products comprises using NOR-NOR logic gating to generate the first group of partial products.

9. The method of claim 7 wherein generating the second group of one partial product comprises using XOR and NAND in combination with a second XOR logic gating to generate the second group of one partial product.

10. The method of claim 7 where generating the third group of three partial products comprises using an AND logic gate for the first partial product, an OR logic gate for the second partial product, and an exclusive OR logic gate for the third partial product.

11. The method of claim 7 wherein the first, second, and third groups of partial products are generated simultaneously.

12. A circuit for generating partial products from two multiple-bit binary numbers in binary unsigned mode, two's complement mode, and mixed mode, the circuit comprising a first group of logic circuits configured to generate partial products from the first and second multiple-bit binary numbers, the first group of logic circuits having an input to receive a first control signal, an input for receiving a bit from the first multiple-bit binary number, and an input for receiving a bit that is not the most significant bit from the second multiple-bit binary number;

a second group of logic circuits configured to generate partial products from the first and second multiple-bit binary numbers, the second group of logic circuits having an input for receiving a second control signal, an input for receiving a bit that is not the most significant bit from the first multiple bit binary number, and an input for receiving a bit from the second multiple-bit binary number;

a third group of logic circuits configured to generate one partial product from the first and second multiple-bit binary numbers, the third group of logic circuits having an input coupled to the first control signal, an input coupled to the second control signal, an input for receiving the most significant bit from the first multiple-bit binary number, and an input for receiving the most significant bit of the second multiple-bit binary number; and a fourth group of logic circuits configured to generate three partial products from the first and second control signals, the fourth group of logic circuits having a first input for receiving the first control signal, and a second input for receiving the second control signal.

* * * * *

UNITED STATES PATENT AND TRADEMARK OFFICE
CERTIFICATE OF CORRECTION

PATENT NO. : 6,151,617
DATED : November 21, 2000
INVENTOR(S) : Costa et al.

It is certified that error appears in the above-identified patent and that said Letters Patent is hereby corrected as shown below:

<u>Column 12, claim 10,</u>
Line 26, "where generating" should read -- wherein generating --.

Signed and Sealed this

Twelfth Day of March, 2002

Attest:

Attesting Officer

JAMES E. ROGAN
*Director of the United States Patent and Trademark Office*